United States Patent
Flaherty et al.

(10) Patent No.: US 12,330,546 B2
(45) Date of Patent: *Jun. 17, 2025

(54) FOLDING WATERCRAFT CARRIER WITH OUTBOARD HANDLE

(71) Applicant: Thule Sweden AB, Hillerstorp (SE)

(72) Inventors: Joseph Flaherty, Prospect, CT (US); Jennifer Romans, Fairfield, CT (US)

(73) Assignee: Thule Sweden AB, Hillerstorp (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/498,469

(22) Filed: Oct. 31, 2023

(65) Prior Publication Data

US 2024/0208393 A1    Jun. 27, 2024

Related U.S. Application Data

(63) Continuation of application No. 17/955,248, filed on Sep. 28, 2022, now Pat. No. 11,820,273, which is a continuation of application No. 16/530,690, filed on Aug. 2, 2019, now Pat. No. 11,485,270, which is a continuation of application No. 15/209,562, filed on Jul. 13, 2016, now Pat. No. 10,384,587.

(51) Int. Cl.
*B60R 9/045* (2006.01)
*B60P 3/06* (2006.01)
*B60P 3/10* (2006.01)
*B60R 9/08* (2006.01)
B63B 32/40 (2020.01)
B63B 34/26 (2020.01)

(52) U.S. Cl.
CPC ............. *B60P 3/1008* (2013.01); *B60P 3/06* (2013.01); *B60R 9/045* (2013.01); *B60R 9/08* (2013.01); B63B 32/40 (2020.02); B63B 34/26 (2020.02)

(58) Field of Classification Search
CPC .......... B60P 3/06; B60P 3/1008; B60R 9/045; B60R 9/08; B63B 34/26; B63B 32/40
USPC ........................................................ 224/315
See application file for complete search history.

(56) References Cited

U.S. PATENT DOCUMENTS

| 1,807,104 | A | 5/1931 | Schat |
| 4,081,118 | A | 3/1978 | Mason |
| 4,261,496 | A | 4/1981 | Mareydt et al. |

(Continued)

FOREIGN PATENT DOCUMENTS

| DE | 10007078 A1 | 8/2001 |
| WO | 2013/019815 A1 | 2/2013 |

OTHER PUBLICATIONS

"Rhino-Rack J-Style Kayak Carrier—Folding—Universal Mount," https://www.etrailer.com/Watersport-Carriers/Rhino-Rack/S512.html, accessed Jul. 13, 2016, 20 pages.

(Continued)

*Primary Examiner* — Peter N Helvey
(74) *Attorney, Agent, or Firm* — Sterne, Kessler, Goldstein & Fox P.L.L.C.

(57) ABSTRACT

A watercraft carrier includes a base, a hub, an upright, and an actuator. The base includes an outboard end, a distal end, and an upper surface. The hub is disposed at the distal end of the base. The upright is coupled to the hub and configured to rotate with respect to the base. The actuator is configured to release the upright from a locked configuration such that the upright can rotate from a first position to a second position. Displacing the actuator in an outboard direction releases the upright from the locked configuration.

14 Claims, 18 Drawing Sheets

(56) References Cited

U.S. PATENT DOCUMENTS

| | | |
|---|---|---|
| 5,516,017 A | 5/1996 | Arvidsson |
| 5,951,231 A | 9/1999 | Allen |
| 6,164,507 A | 12/2000 | Dean et al. |
| 6,460,743 B2 | 10/2002 | Edgerly et al. |
| 6,561,396 B2 | 5/2003 | Ketterhagen |
| 6,868,998 B2 | 3/2005 | Dean |
| 7,780,050 B2 | 8/2010 | Tucker |
| 7,810,686 B2 | 10/2010 | Ilgenfritz |
| 7,815,083 B2 | 10/2010 | Clausen et al. |
| 8,136,708 B2 | 3/2012 | Sautter et al. |
| D719,902 S | 12/2014 | Sautter et al. |
| 9,067,522 B2 | 6/2015 | Laverack et al. |
| 9,126,539 B2 | 9/2015 | Sautter et al. |
| 9,156,410 B2 | 10/2015 | Wang |
| 9,346,409 B2 | 5/2016 | Pfaeffli |
| 2005/0077335 A1 | 4/2005 | Bourne |
| 2006/0273122 A1 | 12/2006 | Bogoslofski et al. |
| 2007/0164065 A1 | 7/2007 | Davis |
| 2009/0120982 A1 | 5/2009 | Sautter et al. |
| 2014/0144959 A1 | 5/2014 | Sautter et al. |
| 2016/0185304 A1 | 6/2016 | Pedrini |
| 2017/0028929 A1 | 2/2017 | Connors |

OTHER PUBLICATIONS

"1 Pair J-Bar Rack Foldable Kayak Carrier Canoe Surf Ski Boat Snowboard Roof Top Mounted on Car SUV Crossbar," http://web.archive.org/web/20151030020625/http://www.amazon.com/Foldable-Carrier-Snowboard-Crossbar-Capacity/dp/B013WLTBZI, archived Oct. 30, 2015, 3 pages.

International Search Report for International Application No. PCT/IB2017/053882, mailed Oct. 17, 2017, 4 pages.

Written Opinion of the International Searching Authority for International Application No. PCT/IB2017/053882, mailed Jan. 18, 2018, 5 pages.

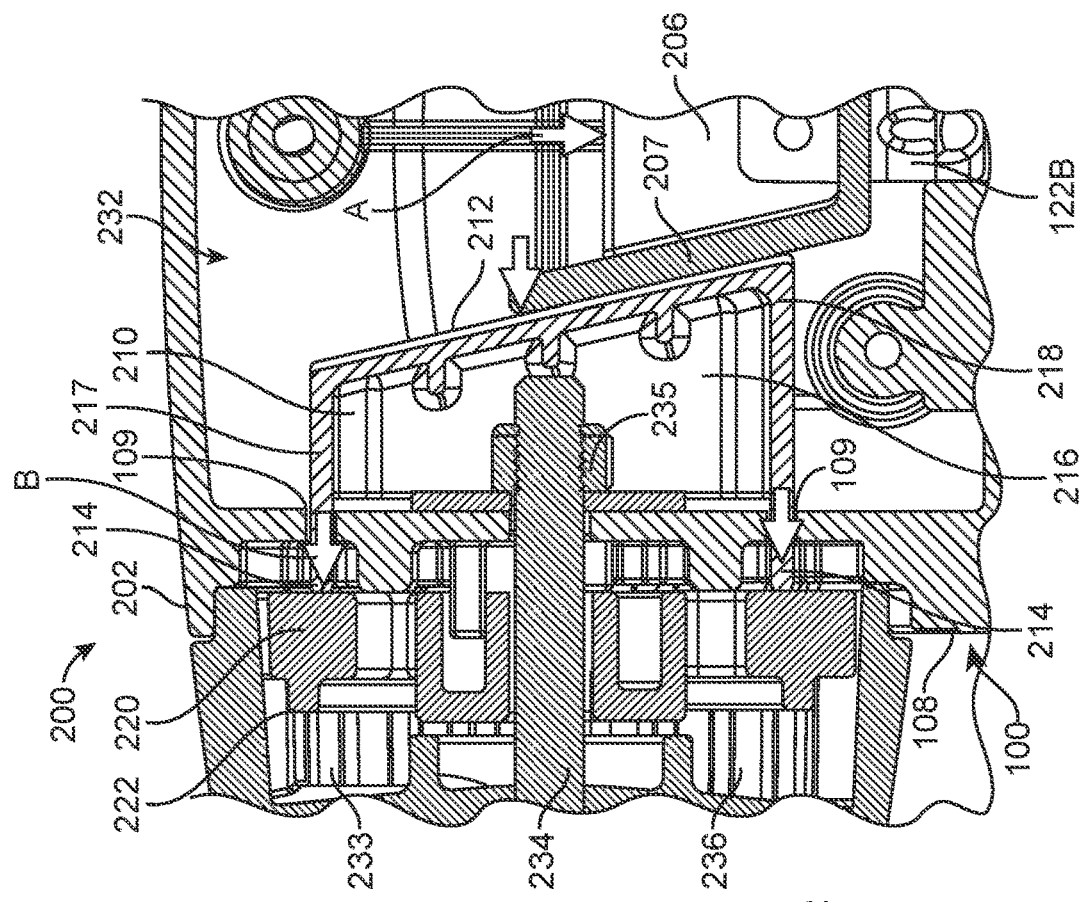
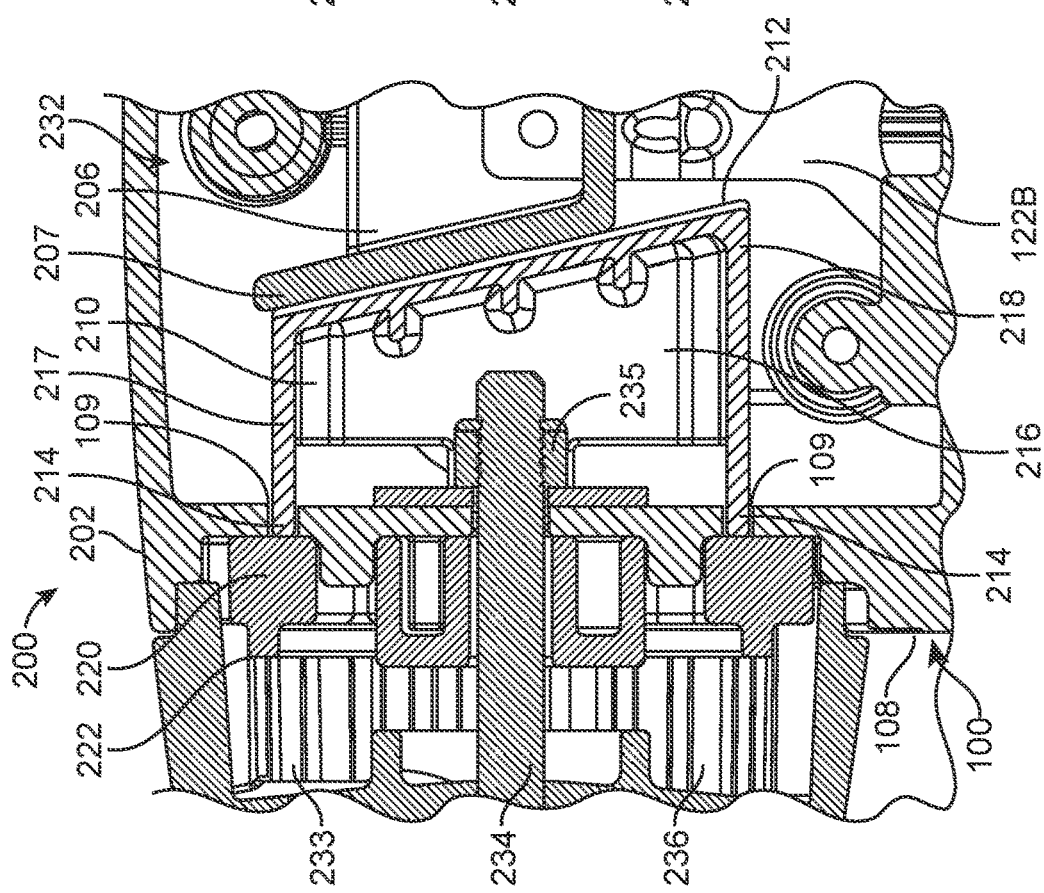
FIG. 11B
FIG. 11A

FOLDING WATERCRAFT CARRIER WITH OUTBOARD HANDLE

CROSS REFERENCE TO RELATED APPLICATIONS

This application is a continuation of U.S. application Ser. No. 17/955,248, filed Sep. 28, 2022, which is a continuation of U.S. application Ser. No. 16/530,690, filed Aug. 2, 2019, which is a continuation of U.S. application Ser. No. 15/209,562, filed Jul. 13, 2016, which are hereby incorporated herein in their entirety by reference.

BACKGROUND

Field

The present disclosure relates to watercraft carriers. More specifically, embodiments of the present disclosure relate to folding watercraft carriers with an outboard pull handle for use on a load bar of a motor vehicle.

Background

Devices for carrying equipment, such as watercraft, for example but not limited to, kayaks, canoes, surfboards, paddleboards, etc., on a vehicle can be used to transport the watercraft from one place to another. The watercraft can be secured to the carrier to safely and conveniently transport the watercraft, for example, on the roof of a motor vehicle.

BRIEF SUMMARY

In some embodiments, a watercraft carrier can include a base having an outboard end, a distal end, and an upper surface. In some embodiments, the watercraft carrier can include a hub disposed at the distal end of the base, an upright coupled to the hub and configured to rotate with respect to the base. In some embodiments, the watercraft carrier can include a handle disposed at the outboard end of the base configured to release the upright from a locked configuration such that the upright can rotate from a first position to a second position. In some embodiments, displacing the handle in an outboard direction can release the upright from the locked configuration. In some embodiments, displacing the handle in the outboard direction can operate a locking mechanism in the hub. In some embodiments, a spring can bias the handle in a distal direction opposite the outboard direction. In some embodiments, the watercraft carrier can be configured to receive a kayak.

In some embodiments, the watercraft carrier can include an intermediate element coupled to the handle and to a wedge disposed in the hub. In some embodiments, the intermediate element can be an elongated plate disposed along a length of the base in an interior compartment of the base. In some embodiments, displacing the handle in the outboard direction can displace the wedge in the outboard direction. In some embodiments, displacing the wedge in the outboard direction can displace a first block in a direction perpendicular to the outboard direction. In some embodiments, the block can displace a gear from a first position to a second position such that the upright can rotate when the gear is in the second position. In some embodiments, a first face of the wedge can engage a first contact face of a first block and a second face of the wedge can engage a second contact face of a second block. In some embodiments, the first face of the wedge and the second face of the wedge can be oblique.

In some embodiments, the upright can be disposed in a lengthwise direction of the base in the first position and the watercraft carrier can be configured to receive a watercraft in the second position. In some embodiments, the upright can be parallel with the base in the first position. In some embodiments, the upright can be in the locked configuration in both the first position and the second position.

In some embodiments, the upright can include a first arm, a second arm, and a crossbar disposed between the first arm and the second arm. In some embodiments, the upright can be a unitary member. In some embodiments, the base can be disposed between the first arm and the second arm when the watercraft carrier is in the first position.

In some embodiments, the upright can be configured to rotate more than 90 degrees from the first position to the second position. In some embodiments, the upright can be configured to rotate about 105 degrees from the first position to the second position.

In some embodiments, a pad can be disposed on the upper surface of the base. In some embodiments, the pad can include a plurality of voids through the pad from a first side to a second side of the pad. In some embodiments, the voids can be disposed between an upper surface and a lower surface of the pad. In some embodiments, the pad can further include a rib separating a first void and a second void. In some embodiments, the rib can extend from the upper surface to the lower surface of the pad.

In some embodiments, the base can include a ramp portion at the outboard end of the base extending upwardly relative to the upper surface of the base at the distal end of the base. In some embodiments, the watercraft carrier can include a mounting foot coupled to the base, which can be configured to couple the watercraft carrier to a load bar on a vehicle.

In some embodiments, a system for carrying a watercraft on a roof of a vehicle can include a first carrying device configured to be mounted on a load bar on the roof of the vehicle. In some embodiments, the first carrying device can include a base having an outboard end and a distal end, where the outboard end is disposed toward a side edge of the roof and the distal end is disposed toward a midline of the roof. In some embodiments, an upright can be coupled to the distal end of the base and configured to rotate with respect to the base. In some embodiments, the upright can be coupled to a hub at the distal end of the base.

In some embodiments, a handle disposed at the outboard end of the base can be configured to release the upright from a locked configuration such that the upright can rotate from a first position to a second position. In some embodiments, the handle can be configured to be displaced toward the side edge of the roof to release the upright from the locked configuration. In some embodiments, displacing the handle toward the side edge of the roof can operate a locking mechanism of the upright at the distal end of the base, for example, inside a hub. In some embodiments, the upright can be configured to rotate more than 90 degrees from the first position to the second position.

In some embodiments, the upright can include a first arm, a second arm, and a crossbar disposed between the first arm and the second arm. In some embodiments, the base can be disposed between the first arm and the second arm and the crossbar can be disposed between the outboard end of the base and the side edge of the roof when the watercraft carrier is in the first position. In some embodiments, the crossbar of the upright can be disposed above the base and between the distal end of the base and the midline of the roof when the watercraft carrier is in the second position.

In some embodiments, the system can include a second carrying device. In some embodiments, the second carrying device can include a base having an outboard end and a distal end, such that the outboard end is disposed toward the side edge of the roof and the distal end is disposed toward the midline of the roof. In some embodiments, an upright coupled to the distal end of the base can be configured to rotate with respect to the base. In some embodiments, a handle disposed at the outboard end of the base can be configured to release the upright from a locked configuration such that the upright can rotate from a first position to a second position.

In some embodiments, a method of operating a watercraft carrier can include activating a handle at an outboard end of a base of the watercraft carrier. In some embodiments, activating the handle can release a locking mechanism of an upright. In some embodiments, the locking mechanism can be disposed at a distal end of the base. In some embodiments, the method can include rotating the upright from a first position to a second position.

In some embodiments, activating the handle can include pulling the handle in an outboard direction. In some embodiments, activating the handle can displace a wedge in a hub at the distal end of the base in a first direction. In some embodiments, displacing the wedge can displace a pair of blocks in opposite directions perpendicular to the first direction. In some embodiments, displacing the pair of blocks can displace a pair of respective gears from an engaged configuration such that the upright can rotate from the first position to the second position. In some embodiments, the method can include activating the handle and rotating the upright from the second position to the first position.

BRIEF DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

FIGS. 11A-11B illustrate a partial interior cross-sectional view of a hub of a watercraft carrier, according to embodiments.

Figure 1:
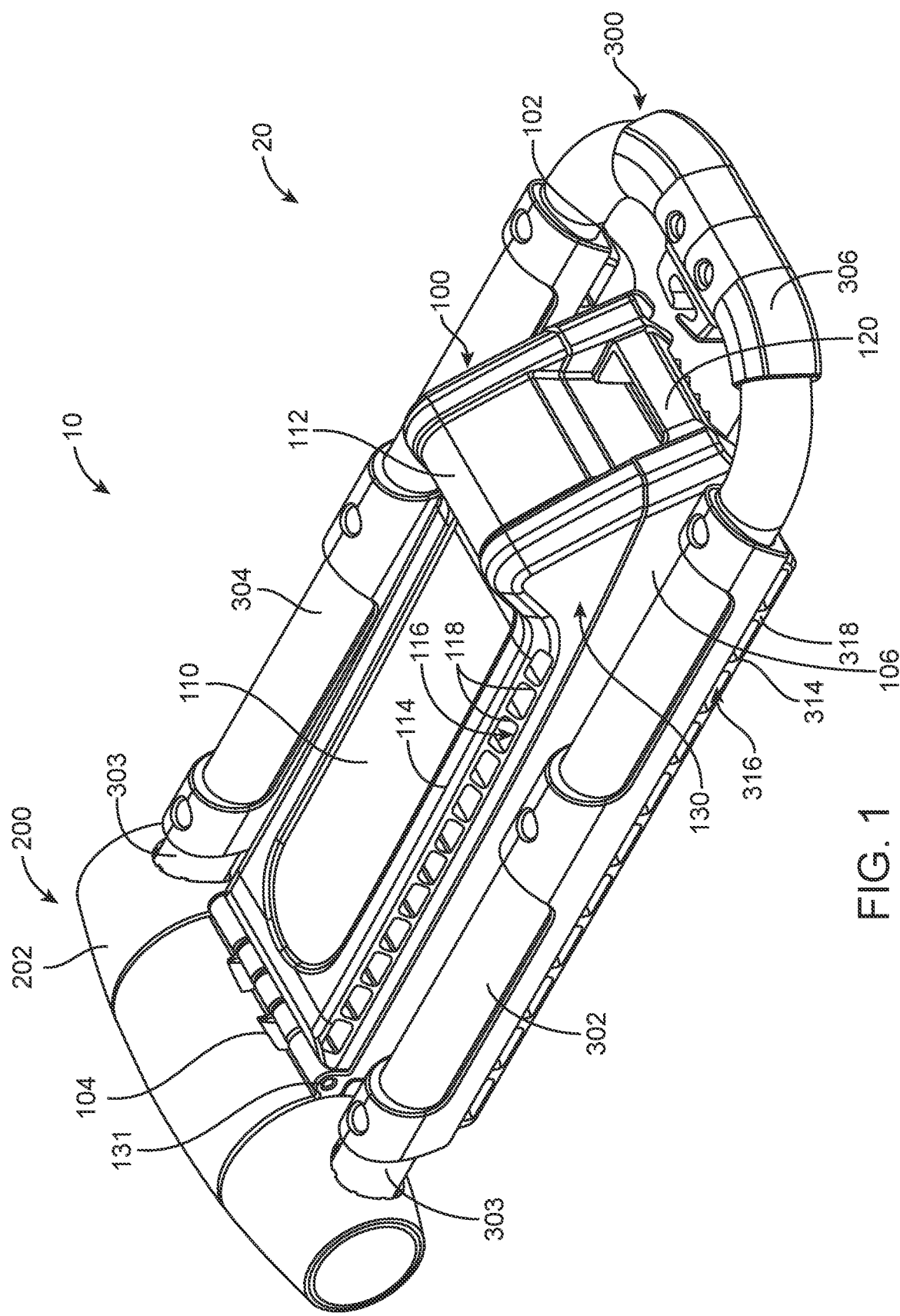
FIG. 1 illustrates a perspective view of a watercraft carrier, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Embodiments of the present disclosure are described in detail with reference to embodiments thereof as illustrated in the accompanying drawings. References to "one embodiment," "an embodiment," "some embodiments," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present embodiments. Other suitable modifications and adaptations of the variety of conditions and parameters normally encountered in the field, and which would be apparent to those skilled in the art, are within the spirit and scope of the disclosure.

FIGS. 1-4 illustrate an embodiment of watercraft carrier 10 in a closed position 20, which can also be referred to as a storage position or a non-use position. Generally, in closed position 20, a watercraft is not disposed on watercraft carrier 10. By having upright 300 folded downward, as shown in FIGS. 1-4, the profile and thus wind resistance and noise produced by watercraft carrier 10 can be reduced when disposed on a roof a of a vehicle while travelling.

Figure 5:
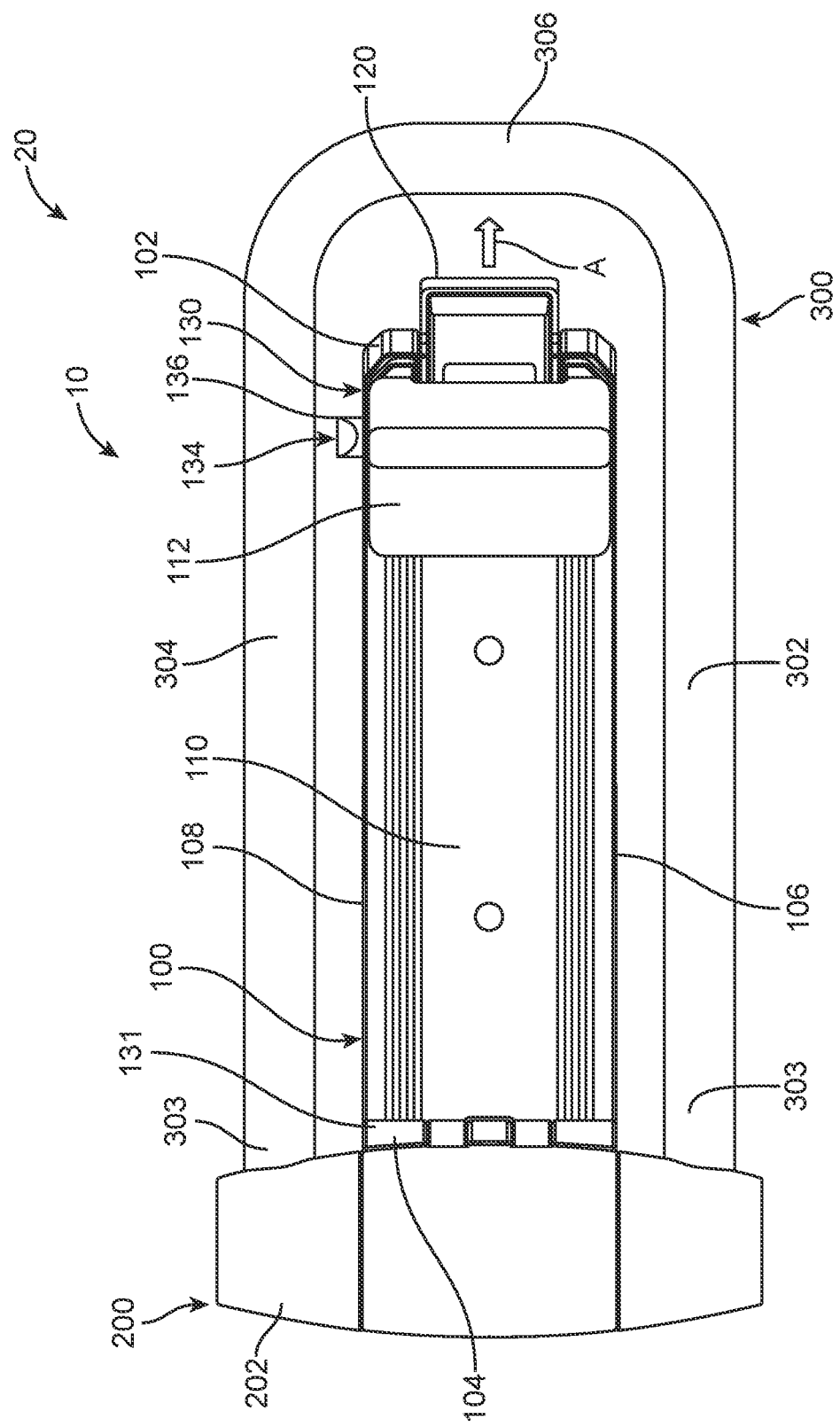
FIG. 5 illustrates a top perspective view of a watercraft carrier, according to an embodiment.

As shown, for example in FIG. 5, a user can pull a handle 120 conveniently disposed at an outboard end 102 of a base 100 of watercraft carrier 10, for example, in the direction of arrow A shown in FIG. 5. Pulling the handle 120 can release a locking mechanism so that upright 300 can be rotated about base 100 to an in-use or open position 30, for example as shown in FIGS. 13-17. The location of handle 120 at outboard end 102 of base 100 simplifies and improves access by the user to the unlocking mechanism for upright 300. By locating handle 120 at the outboard end 102 of base 100 rather than, for example, at the distal end 104 of base 100 near hub 200, the user can more easily reach the mechanism by which upright 300 can be released from a locked position, for example, closed position 20 or open position 30.

Referring again to FIGS. 1-4, watercraft carrier 10 is shown in a closed position 20, according to an embodiment. In some embodiments, in closed position 20, upright 300 can be disposed generally in a lengthwise direction of base 100. In some embodiments, upright 300 can be parallel with a lengthwise axis of base 100 in the closed position 20. In some embodiments, upright 300 can be wider and longer than base 100 such that upright 300 surrounds base 100 on at least three sides, for example, as shown in the top view of FIG. 4.

Figure 18:
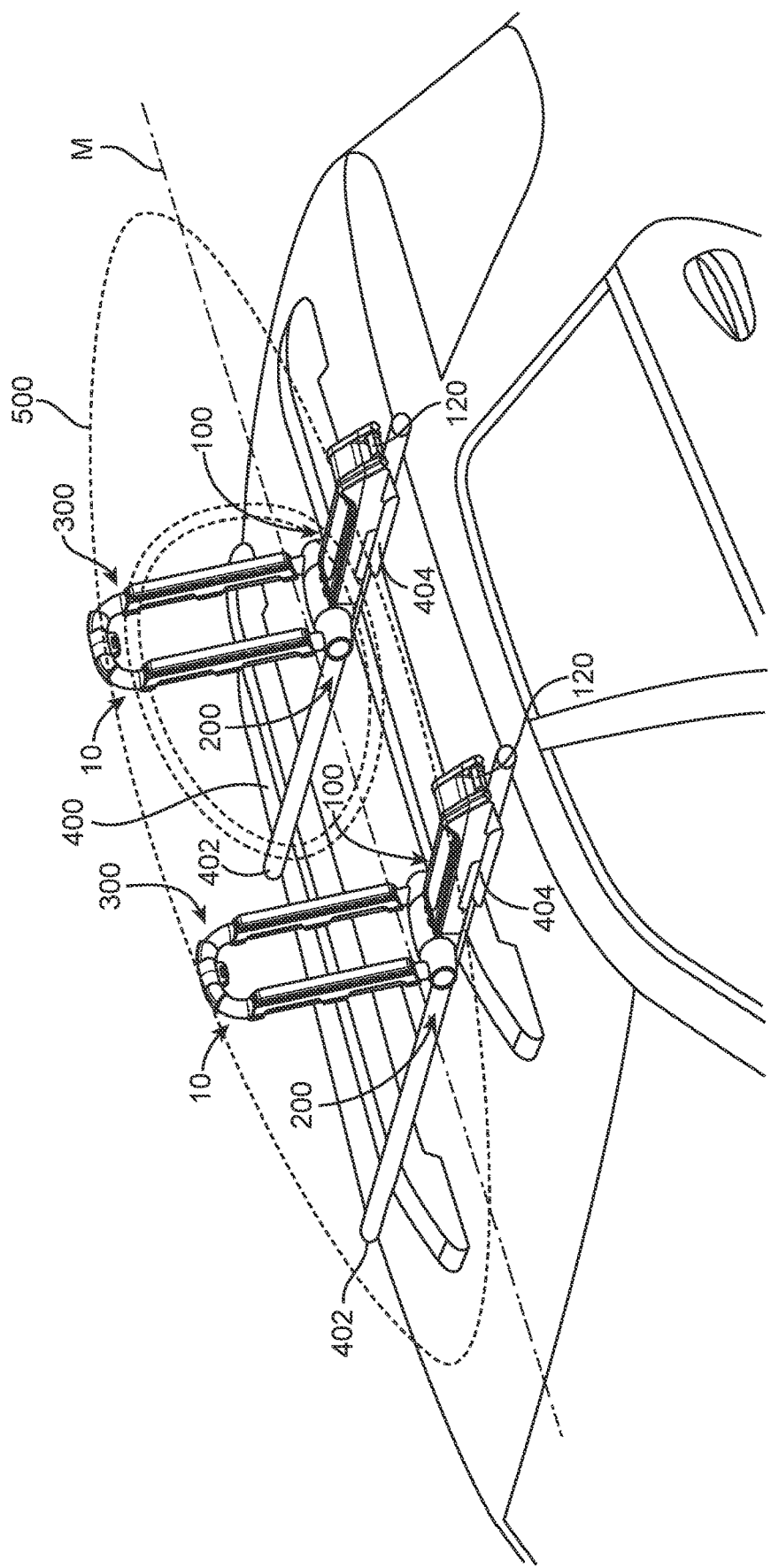
FIG. 18 illustrates a perspective view of watercraft carriers on a motor vehicle, according to an embodiment.

Watercraft carrier 10 can include a base 100, which can be made from any suitable material, for example but not limited to, plastic or metal. Base 100 can have an outboard end 102, which can be located closest to the user when watercraft carrier 10 is disposed on a motor vehicle, for example, on a load bar attached to a roof of a vehicle. FIG. 18, for example, illustrates a pair of watercraft carriers 10 on load bars 402 of a vehicle roof 400, with handle 120 disposed at the outboard end 102 of the base 100 closest to the side of the vehicle. Base 100 can also include a distal end 104 opposite outboard end 102. Distal end 104 can be disposed adjacent to or be part of hub 200. Distal end 104 can be disposed closer to a longitudinal midline M of the vehicle than the outboard end 102. Base 100 can include first longitudinal sidewall 106 and second longitudinal sidewall 108 extending from outboard end 102 to distal end 104, as shown for example in FIGS. 1 and 4.

Figure 2:
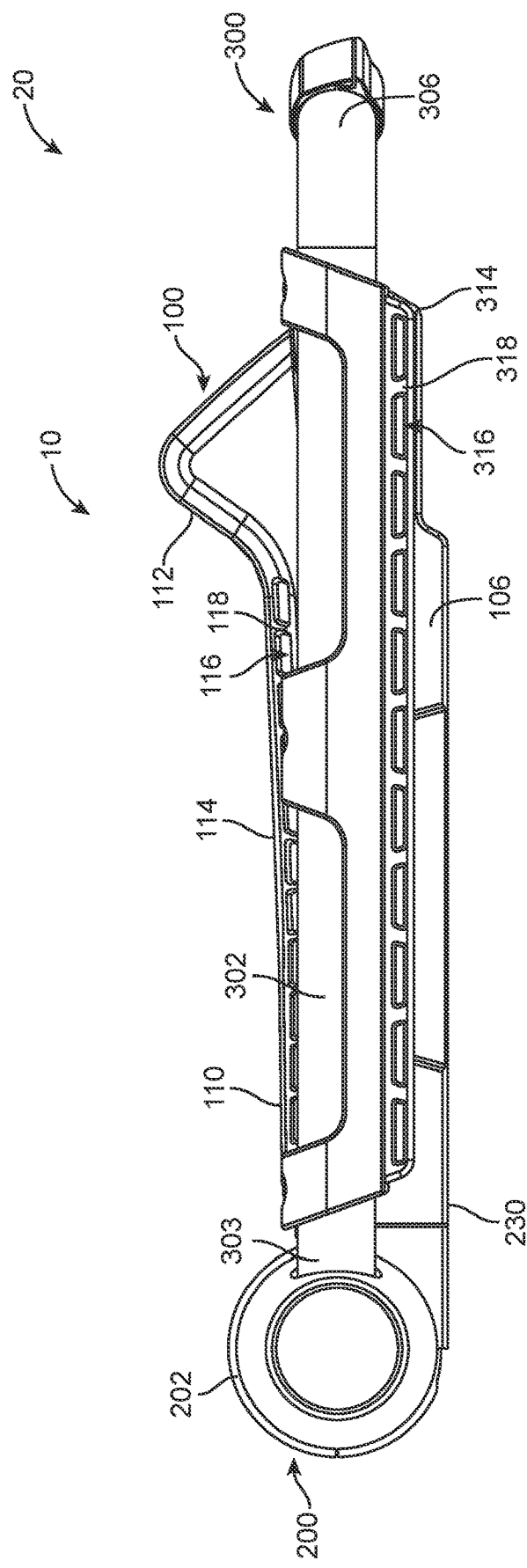
FIG. 2 illustrates a side view of a watercraft carrier, according to an embodiment.
Figure 3:
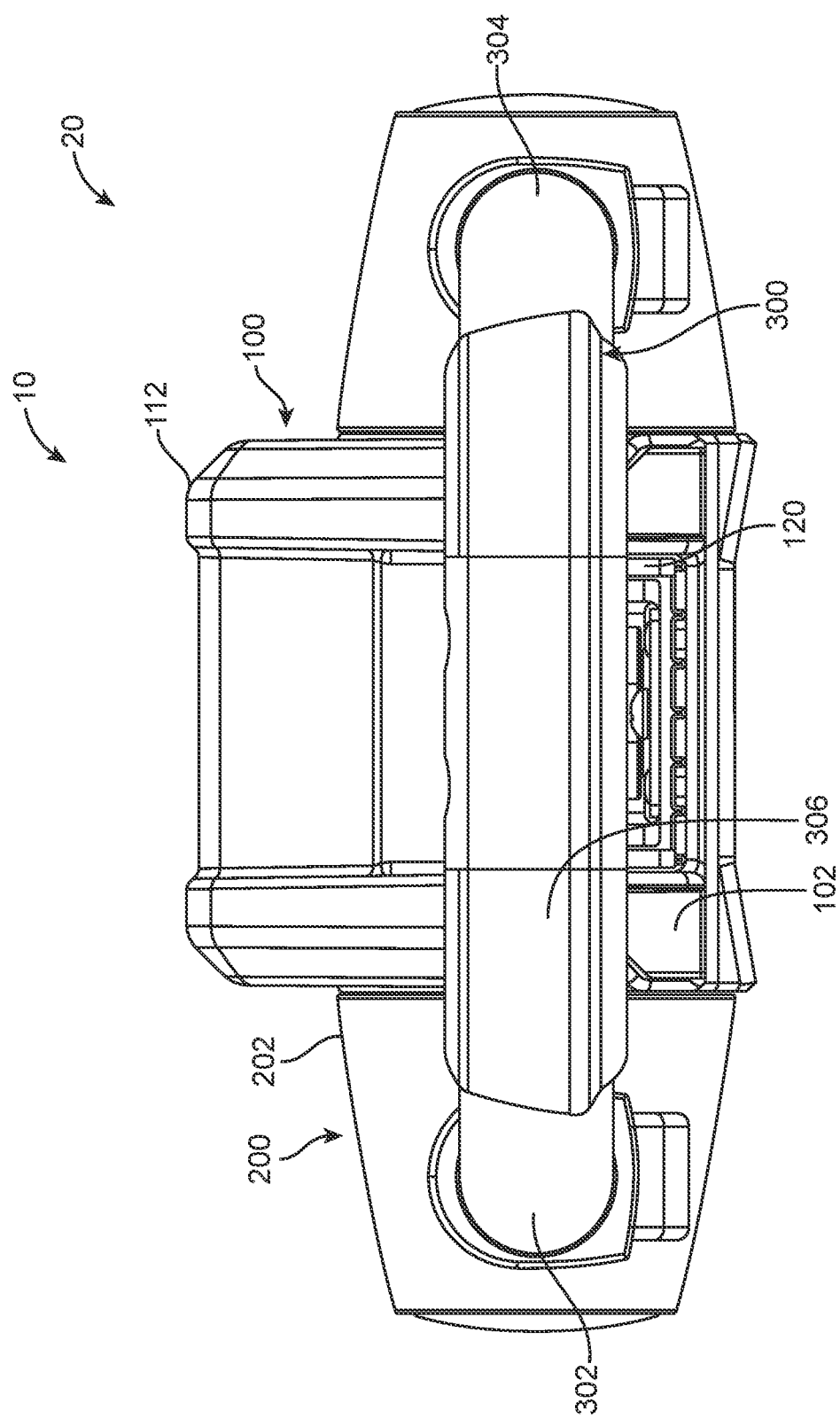
FIG. 3 illustrates a front view of a watercraft carrier, according to an embodiment.
Figure 4:
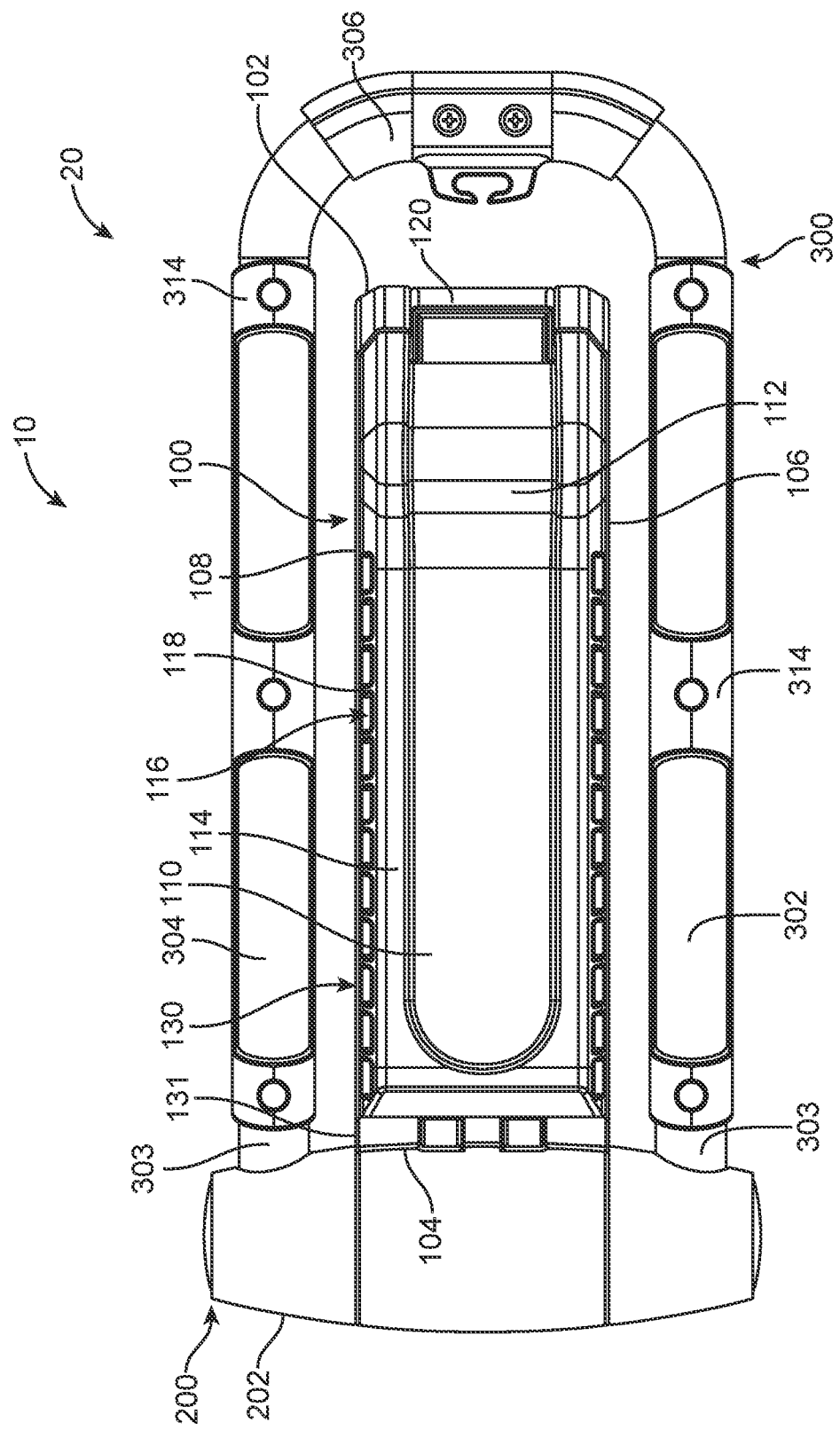
FIG. 4 illustrates a top view of a watercraft carrier, according to an embodiment.

Base 100 can include upper surface 110, which can face the watercraft to be carried upon the watercraft carrier 10. In some embodiments, upper surface 110 of base 100 can include ramp 112. Ramp 112 can facilitate holding the watercraft on the watercraft carrier 10 and prevent the watercraft from slipping off the outboard end 102 of base 100. Ramp 112 can extend at an upward angle from a longitudinal portion of upper surface 110 of base 100. For example, ramp 112 can extend upward near outboard end 102 of base 100, as shown in FIG. 2. The height and incline of ramp 112 can be varied. In some embodiments, the incline of ramp 112 can be about 45 degrees.

Figure 7:
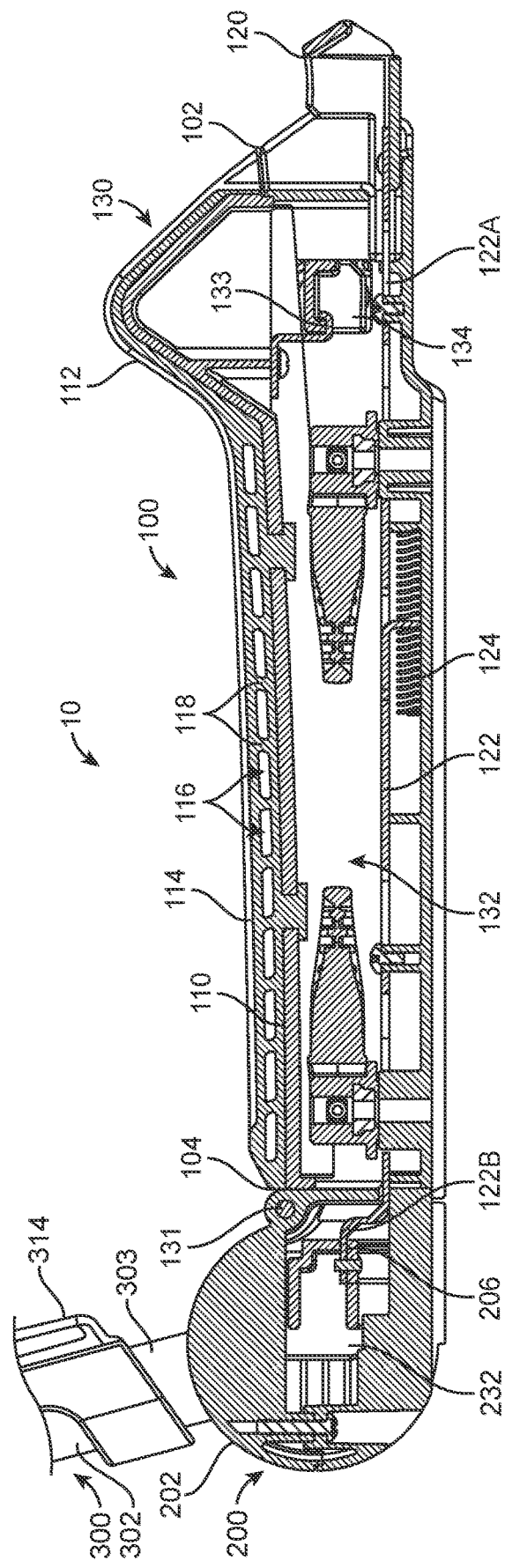
FIG. 7 illustrates a cross-sectional view of a base of a watercraft carrier, according to an embodiment.

In some embodiments, one or more pad 114 can be disposed on or constitute upper surface 110 of base 100. Pad 114 can be made of any suitable material, for example but not limited to, rubber, plastic, foam, or a composite material. In some embodiments, pad 114 can have a structure as described, for example, in U.S. Pat. No. 9,975,494, which is incorporated by reference herein in its entirety. In some embodiments, for example, as shown in FIGS. 1, 2, and 7, pad 114 can include one or more void 116 extending through pad 114 from first longitudinal sidewall 106 to second longitudinal sidewall 108 of base 100. In some embodiments, ribs 118 can be disposed between voids 116 in pad 114. Voids 116 and ribs 118 can provide cushioning and flexion to pad 114. This can reduce what are known as "hot spots" on the watercraft hull, where localized friction and/or pressure can build up on the hull while being carried on watercraft carrier 10 due to the shape of the hull and its position on the pad 114. In some embodiments, a plurality of voids 116 and ribs 118 can extend across the width of the pad 114 from distal end 104 to outboard end 102 of base 100. In some embodiments, a portion of pad 114 along ramp 112 can include voids 116 and ribs 118 (not shown).

In some embodiments, base 100 of watercraft carrier 10 can include handle 120. In some embodiments, handle 120 can be disposed at outboard end 102 of base 100. This makes handle 120 easily accessible to the user standing at the side of the vehicle. In some embodiments, handle 120 can be pulled in the outboard direction (i.e., toward the near side of the car) by a user to release a locking mechanism of upright 300. In some embodiments, pulling handle 120 can activate mechanisms within hub 200 to release upright 300 from a closed position 20 or an open position 30, as described in more detail below, for example, with respect to FIGS. 9A, 9B, 10A, 10B, 11A, 11B, 12A, and 12B.

Other activation mechanisms for handle 120 are also contemplated. For example, a lever, dial, knob, button, or similar mechanism can be disposed at outboard end 102 of base 100 that can activate mechanisms to release upright 300 from a locked position. By way of example, a user could turn a knob or press a lever, which is connected through a linkage to distal end 104 of base 100. Doing so can activate mechanisms, for example, within hub 200, to release upright 300 as described below.

In some embodiments, for example, as shown in FIGS. 1-4, handle 120 can be proximate to upright 300 when upright 300 is in the closed position 20. For example, handle 120 can be proximate to crossbar 306 of upright 300, for example, within 6 inches. This can facilitate and simplify transitioning upright 300 from the closed position 20 to the open position 30. For example, the user can easily operate handle 120 with one hand and push the upright 300 inboard toward the distal end 104 of the base 100 with the other hand. The user does not need to reach, for example, to the distal end 104 of the base 100, which can be particularly difficult when the watercraft carrier 10 is disposed on the roof of a vehicle. Similarly, when transitioning upright 300 from the open position 30 to the closed position 20, the user can pull handle 120 and grab any part of upright 300 to pull it in the outboard direction. This is easier and safer than trying to operate a mechanism at the distal end 104 of the base 100.

In some embodiments, base 100 can include top cover 130. In some embodiments, top cover 130 can include upper surface 110 and/or pad 114. In some embodiments, top cover 130 can be secured to base 100 at hinge 131 at distal end 104. As shown, for example in FIG. 6, in some embodiments, top cover 130 can be opened to expose base compartment 132. For example, in some embodiments, a lock 134 can be unlocked, for example, by rotating knob 136. Upon rotating knob 136, lock core 138 can rotate such that a notch 139 which can engage a flange 133 on an interior of top cover 130 (see, for example, FIG. 7) releases from a locked position. Other locking mechanisms for top cover 130 can also be used, for example, a key and lock core or friction-fit locking members.

Figure 6:
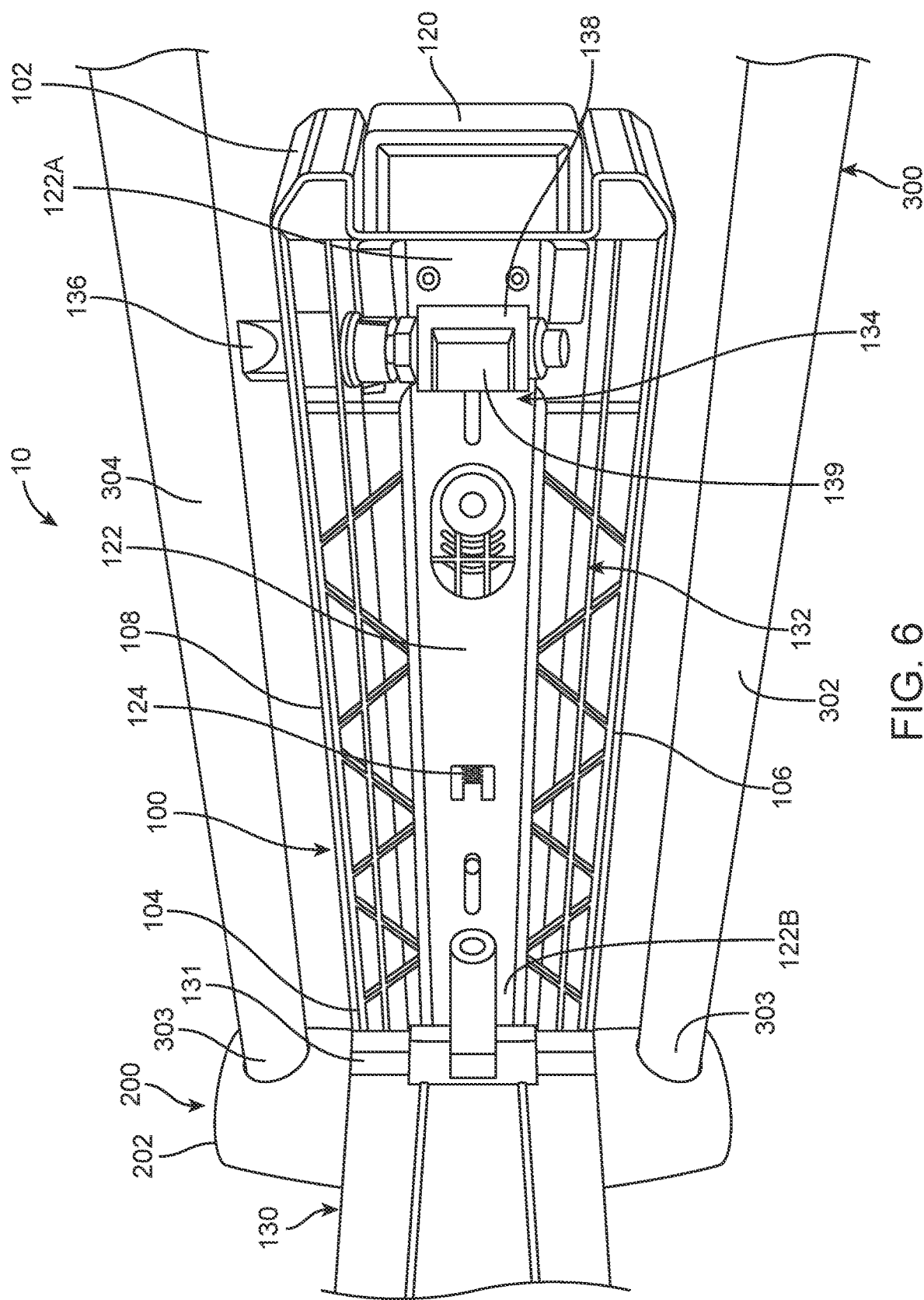
FIG. 6 illustrates an interior of a watercraft carrier, according to an embodiment.

As shown in FIGS. 6 and 7, in some embodiments, handle 120 can be attached to an intermediate member, for example, plate 122. In some embodiments, plate 122 can extend from outboard end 102 of base 100 to distal end 104. As described in greater detail below, the distal end 122B of plate 122 can be attached to a wedge 206 or other mechanism within hub 200 to activate the components that release upright 300 from the locked position.

In some embodiments, spring 124 can bias plate 122 and therefore handle 120 attached to proximal end 122A of plate 122 toward distal end 104. As shown, for example in FIG. 5, the handle 120 can be pulled in the outboard direction, thereby displacing plate 122 in the outboard direction and pulling wedge 206 in the outboard direction within hub 200 as well. The mechanisms within hub 200 are described in further detail below.

Plate 122 can be made from any suitable material, for example but not limited to, metal or plastic. Other intermediate members or linkages can be used in place of plate 122.

For example, a chain, wire, cord, cable, rod, or other connection element can connect handle 120 with, for example, wedge 206.

Referring again to FIGS. 1-4, in some embodiments, watercraft carrier 10 can include upright 300. In some embodiments, upright 300 can include first arm 302 and second arm 304. In some embodiments, first arm 302 can be connected to second arm 304 by crossbar 306, such that there is a space between first arm 302 and second arm 304. In some embodiments, first arm 302 and second arm 304 can be disposed outside of first longitudinal sidewall 106 and second longitudinal sidewall 108 of base 100, respectively. In some embodiments, upright 300 can be an integral component such that first arm 302, second arm 304 and crossbar 306 are made from the same piece of material. Upright 300 can be made from any suitable material, for example but not limited to, metal or plastic. In some embodiments, upright 300 can have U-shape, such that respective connection ends 303 of first arm 302 and second arm 304 are coupled to hub 200 and crossbar 306 is disposed at an opposite end. In some embodiments, upright 300 can be a hollow tube, which can decrease the weight of upright 300.

In some embodiments, upright 300 can include one or more pad 314. Pad 314 can be made of any suitable material, for example, rubber, plastic, or foam. In some embodiments, for example as shown in FIG. 2, pads 314 can include one or more void 316 with ribs 318 disposed there between, similar to pad 114 of base 100 described above. Pads 314 can be disposed partially or entirely around upright 300. For example, in some embodiments, each of first arm 302 and second arm 304 can have a pad 314. In some embodiments, crossbar 306 can have a pad 314. These pads 314 can provide benefits as described above with respect to pad 114 of base 100.

In some embodiments, upon activation of handle 120, which can release a locking mechanism, upright 300 can rotate from a first position, for example, closed position 20, to a second position, for example, open position 30, or vice versa. The locking mechanism can be any mechanism that prevents rotation of handle 120, for example, but not limited to interference mechanisms, geared mechanisms, friction-fit mechanisms, keyed mechanisms, etc. In some embodiments, upright 300 can rotate freely between the closed position 20 and open position 30, but upon reaching the closed position 20 and/or open position 30, upright 300 locks in place.

Figure 8:
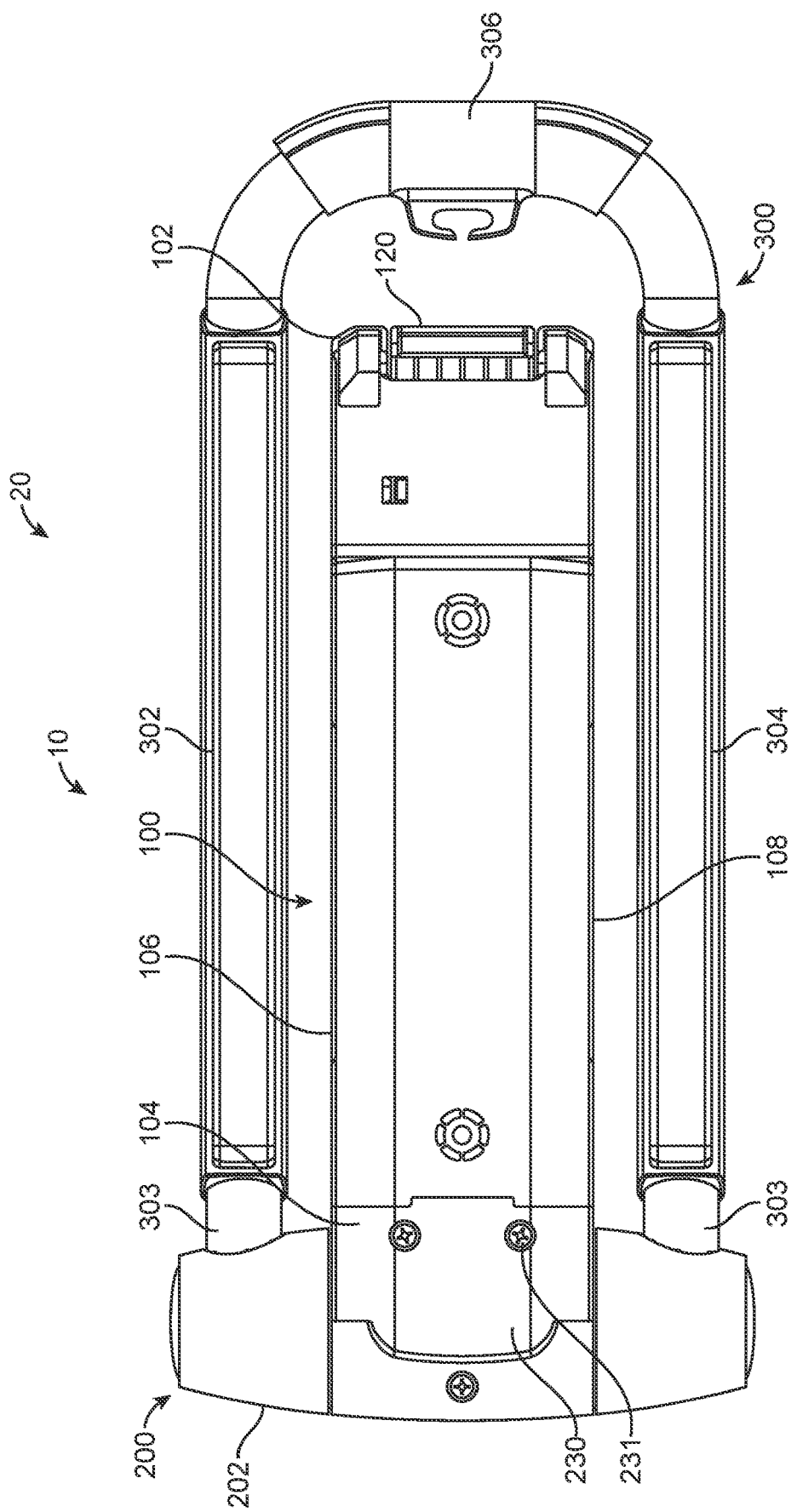
FIG. 8 illustrates a bottom view of a watercraft carrier, according to an embodiment.

FIG. 8 illustrates a bottom view of watercraft carrier 10, according to an embodiment. As shown in FIG. 8, in some embodiments, hub 200 can include housing 202. In some embodiments, one or more portion of housing 202 can rotate with upright 300. Hub 200 can have a rear cover 230 which can be coupled to or form a part of housing 202 of hub 200. Rear cover 230 can be removably attached, for example, by screws 231. In some embodiments, rear cover 230 can be located near distal end 104 of base 100.

Figure 9A:
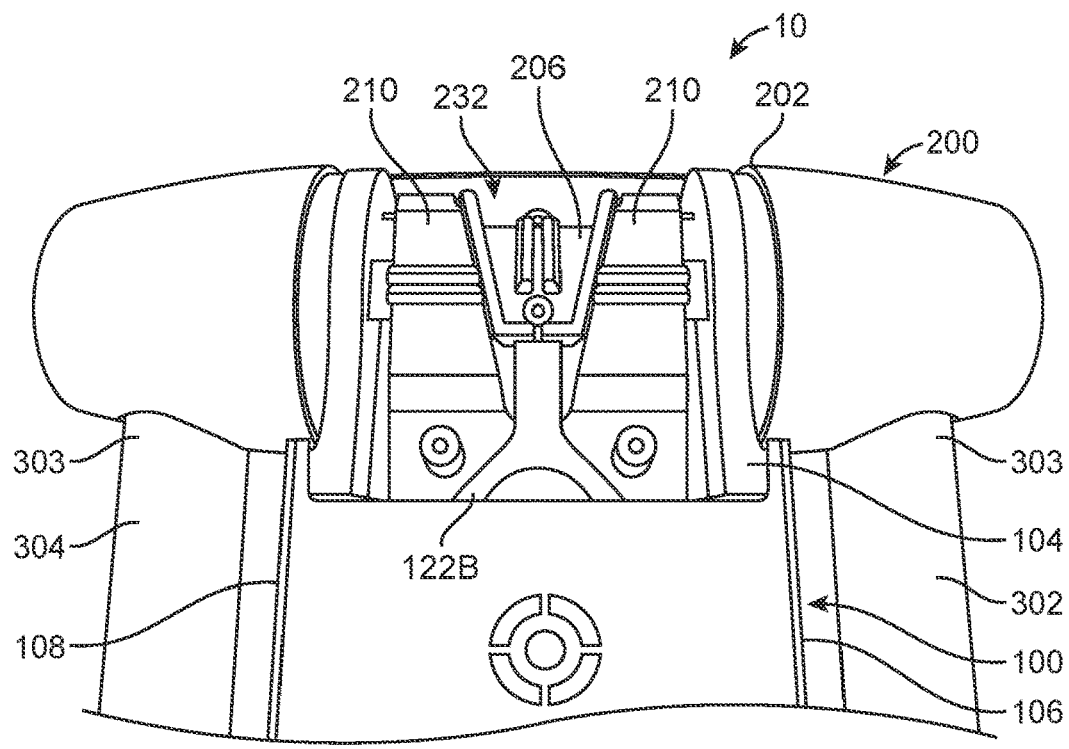
FIGS. 9A-9B illustrate an interior view of a hub of a watercraft carrier, according to embodiments.
Figure 9B:
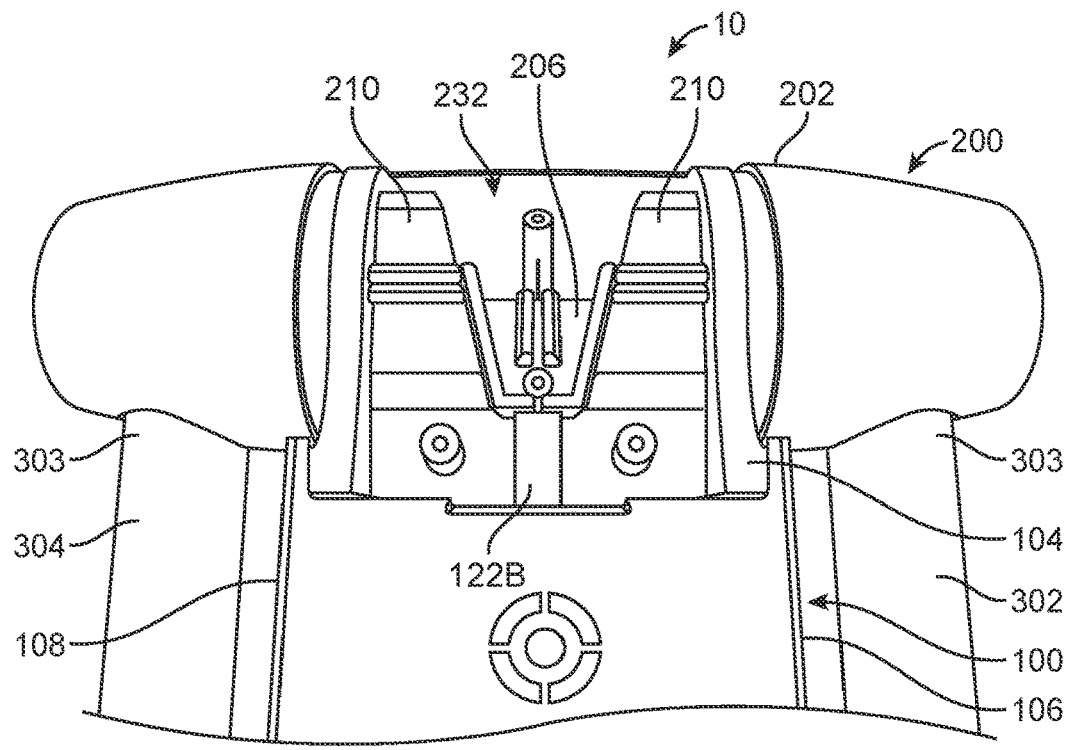

FIGS. 9A and 9B illustrate embodiments of watercraft carrier 10 with rear cover 230 removed. As shown in FIGS. 9A and 9B, in some embodiments, plate 122 can be coupled to wedge 206 within hub 200. In some embodiments, wedge 206 can be disposed between first and second blocks 210 within hub 200.

FIG. 9A illustrates an embodiment where handle 120 is in a rest state, where it is not being pulled in the outboard direction. In this configuration, upright 300 is locked in the closed position 20 in FIG. 9A. In some embodiments, spring 124 can bias plate 122 and therefore wedge 206 to the rest state.

FIG. 9B illustrates a configuration where handle 120 is pulled in the outboard direction. Plate 122 and therefore wedge 206 coupled thereto are also pulled in the outboard direction. In some embodiments, as wedge 206 is moves in the outboard direction, blocks 210 are forced outward within hub compartment 232 such that blocks 210 move in a direction toward the first longitudinal sidewall 106 and second longitudinal sidewall 108 of base 100, respectively. As described in more detail below, the movement of blocks 210 outward can disengage gears within gears 220 within hub 200, thereby unlocking upright 300 such that it can be rotated to the open position 30. The watercraft carrier can be similarly operated to rotate the upright 300 from the open position 30 to the closed position 20.

Figure 10A:
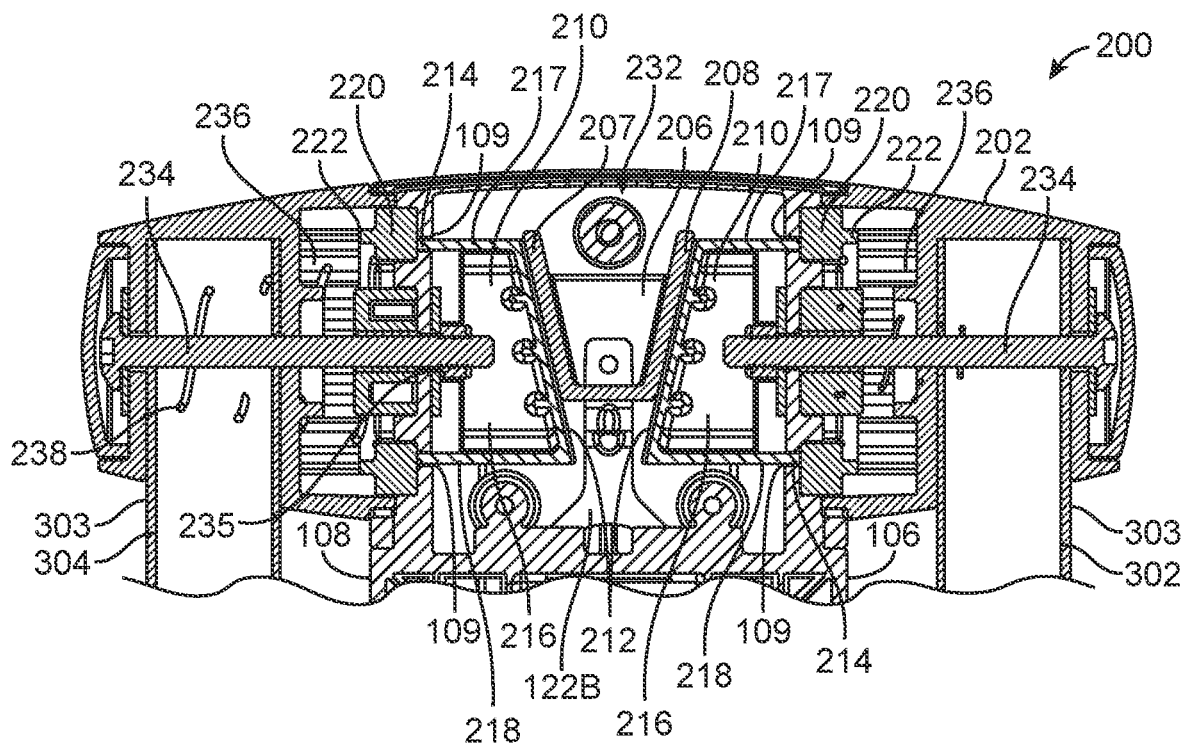
FIGS. 10A-10B illustrate an interior cross-sectional view of a hub of a watercraft carrier, according to embodiments.

FIGS. 10A-12B illustrate components within hub 200 which allow upright 300 to be released from the locked position so that it can transition from the closed position 20 to the open position 30, and vice versa, according to embodiments. FIGS. 10A and 11A illustrate an embodiment where handle 120 is not being pulled, as in FIG. 9A. Likewise, FIGS. 10B and 11B illustrate an embodiment where handle 120 is pulled in the outboard direction indicated by arrow A, as in FIG. 9B. The arrows B and C in FIGS. 10B and 11B indicate directional movement of the wedge 206 and blocks 210. Activation of the handle 120 at outboard end 102 of base 100 can initiate movement of the components in hub 200.

In some embodiments, hub 200 can include housing 202 with wedge 206 and blocks 210 disposed within hub compartment 232. In some embodiments, wedge 206 can include first face 207 and second face 208. In some embodiments, first face 207 and second face 208 can be angled toward each other from a distal end toward an outboard end of wedge 206 (i.e., at an oblique angle). In some embodiments, first face 207 and second face 208 can contact respective contact faces 212 of blocks 210. In some embodiments, contact faces 212 of one or more blocks 210 can be disposed parallel to respective first face 207 and second face 208 of wedge 206. Wedge 206 and blocks 210 can be made from any suitable material, for example but not limited to, plastic.

Figure 10B:
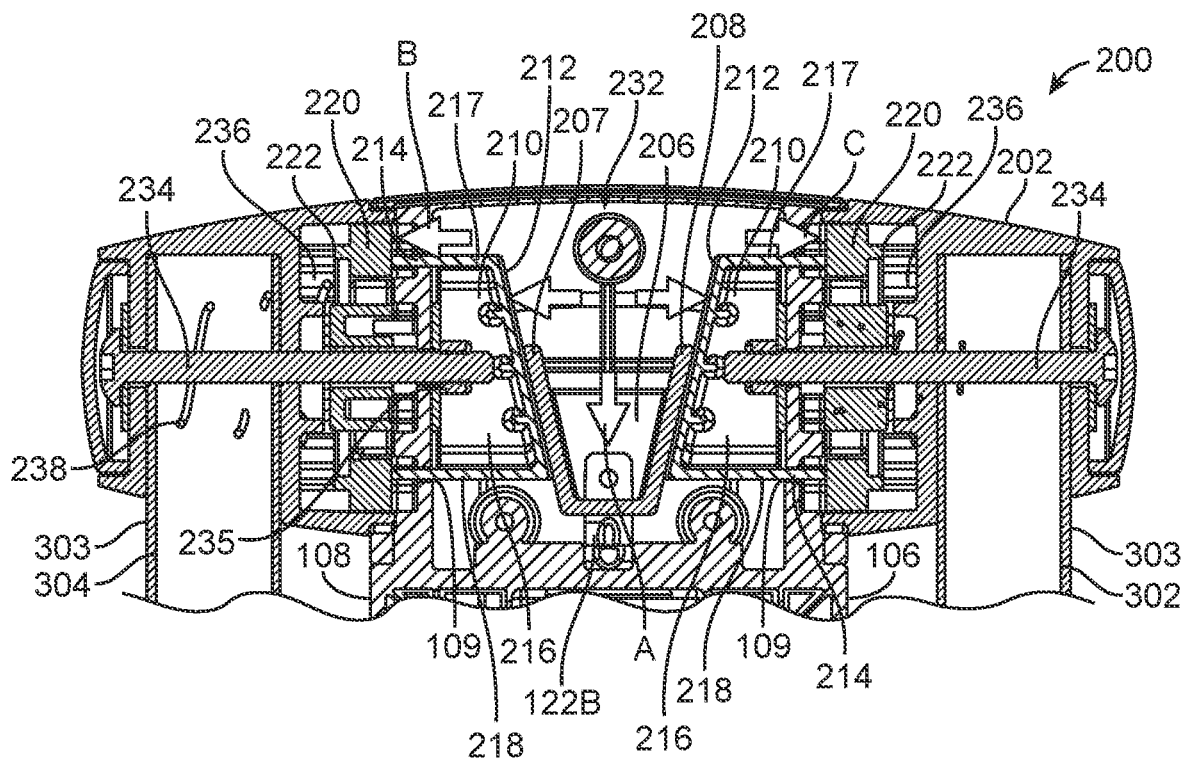

As shown, for example in FIGS. 10B and 11B, in some embodiments, when handle 120 is pulled in the outboard direction, wedge 206, which can be attached to distal end 122B of plate 122, can also be pulled in the outboard direction. Movement of wedge 206 can force blocks 210 outward toward respective first arm 302 and second arm 304 of upright 300. In some embodiments, blocks 210 can move in a direction perpendicular to the direction of wedge 206.

In some embodiments, blocks 210 can have one or more arm 214. In some embodiments, arms 214 can extend through respective holes 109 in housing 202 of hub 200. In some embodiments, arms 214 can press against respective gears 220, which can be disposed in gear spaces 236 in hub 200. The displacement of gears 220 outward by blocks 210 can disengage teeth 222 of gears 220 from grooves 233 in hub 200. In some embodiments, the release of this toothed interaction can release upright 300 from a locked position so that it can be rotated. Once upright 300 is unlocked, it can be rotated, for example, about an axis extending through fasteners 234, which can couple upright 300 with hub 200 and/or base 100.

Figure 12A:
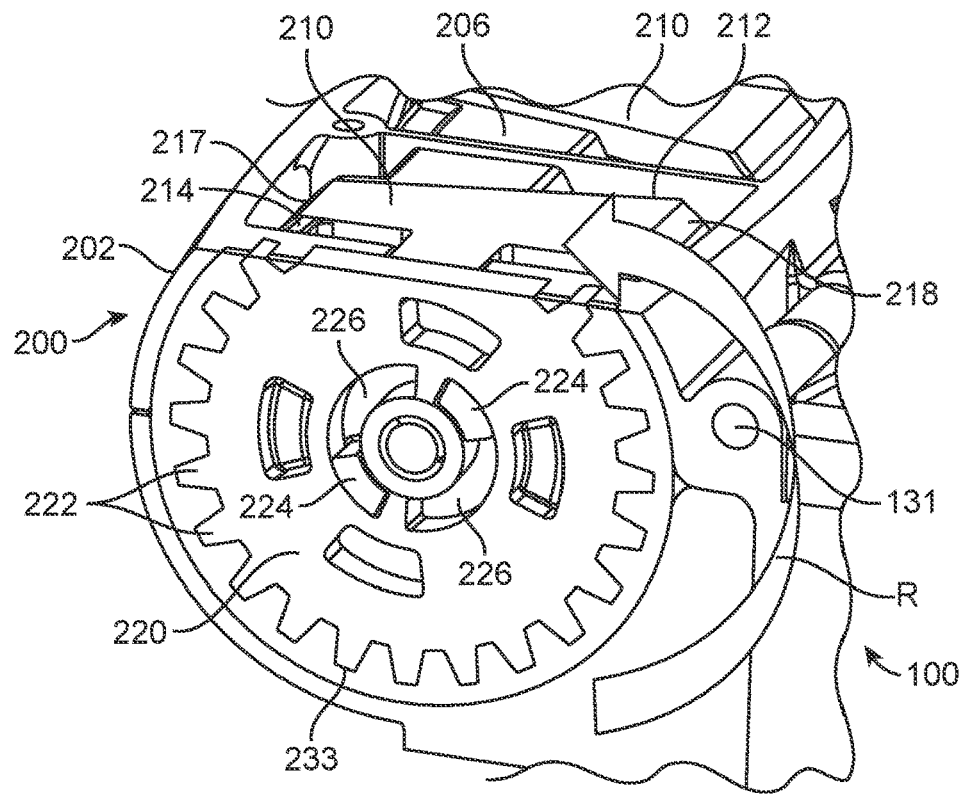
FIGS. 12A-12B illustrate a partial interior view of a hub of a watercraft carrier, according to embodiments.
Figure 12B:
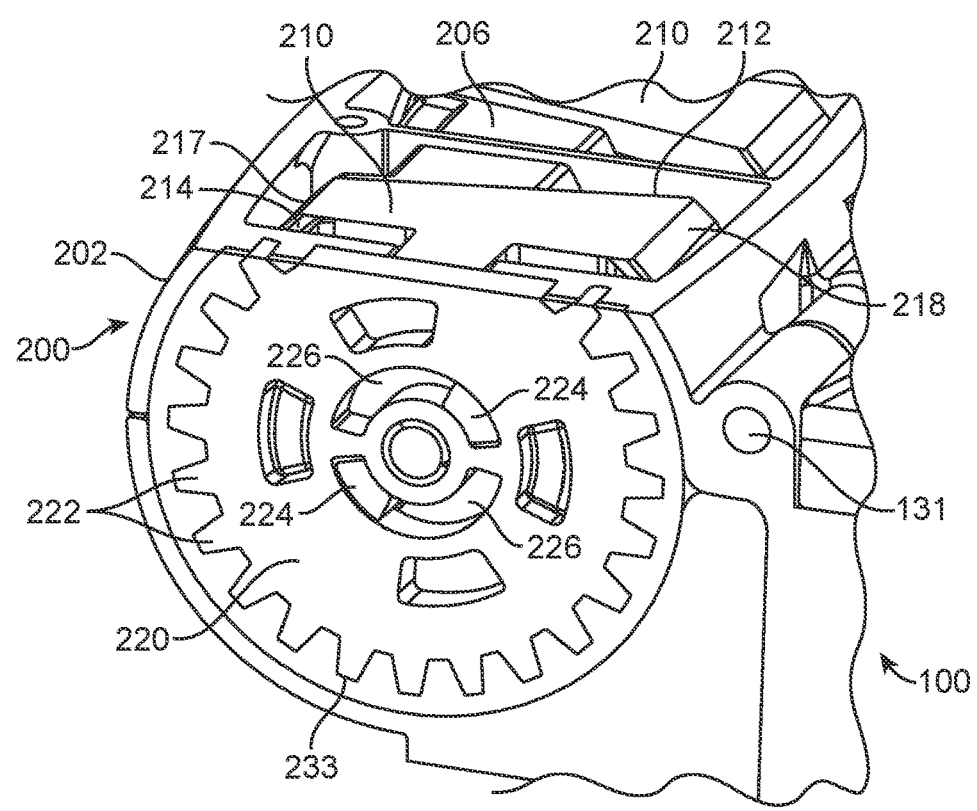

As shown, for example, in FIGS. 12A and 12B, in some embodiments, hub 200 can include one or more locking ribs 224, which can be disposed in respective channels 226 of gear 220. When handle 120 is pulled to displace wedge 206 in the outboard direction, thereby displacing blocks 210, upright 300 can be rotated, for example, in the direction indicated by the arrow R in FIG. 12A. In some embodiments, locking ribs 224 can be used to limit the rotational movement of upright 300. For example, in some embodiments, upright 300 can be rotated 90° or more from the closed position 20 to the open position 30. In some embodiments, watercraft carrier 10 can be rotated 105° from the closed position 20 to the open position 30. In some embodiments, once upright 300 reaches the maximum rotation permitted by locking ribs 224, teeth 222 of gears 220 can lock back into place with grooves 223 in hub 200 to lock upright 300 in place. In some embodiments, upright 300 can be free to move between the closed position 20 and the open position 30. In some embodiments, upon reaching either the closed position 20 or the open position 30, upright 300 can lock in place. Pulling on handle 120 can release upright 300 from either the closed position 20 or open position 30.

Figure 13:
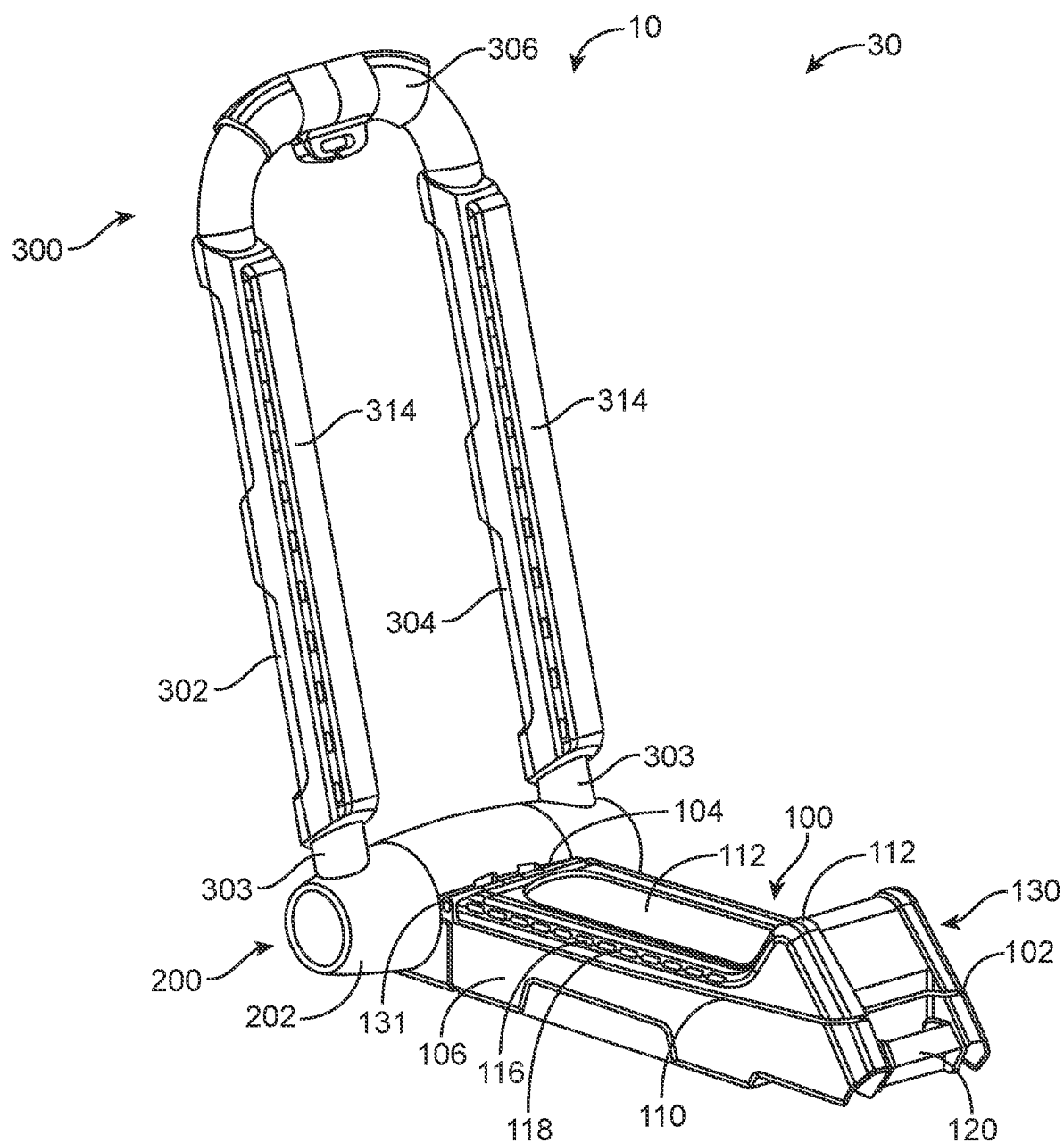
FIG. 13 illustrates a perspective view of a watercraft carrier, according to an embodiment.

FIGS. 13-17 illustrate views of watercraft carrier 10 in an open position 30, according to an embodiment. FIG. 13 illustrates a perspective view of watercraft carrier 10 in an open position 30. Watercraft carrier 10 can reach the configuration shown in FIG. 13, for example, by pulling handle 120 and rotating upright 300 toward distal end 104 of base 100. Upon reaching the open position 30, upright 300 can lock in place such that it cannot be rotated without pulling handle 120. Upon pulling handle 120, upright 300 can be rotated back toward the outboard end 102 of base 100 to the closed position 20.

Figure 14:
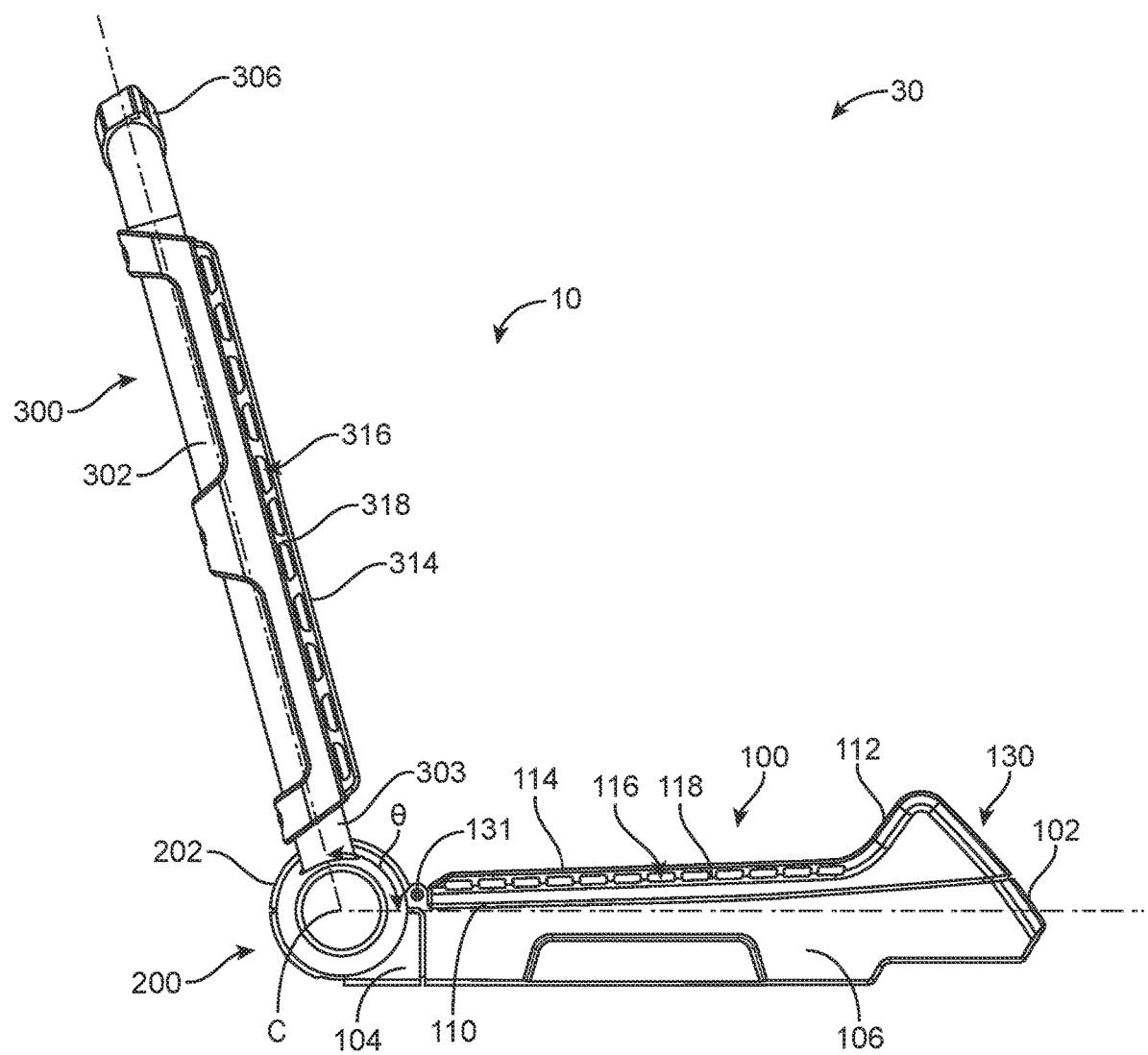
FIG. 14 illustrates a side view of a watercraft carrier, according to an embodiment.

As shown, for example in FIG. 14, upright 300 can be disposed at an angle θ with respect to the longitudinal direction of base 100 in the open position 30. The angle θ can be calculated between the lengthwise axis of base 100 from outboard end 102 to distal end 104 through a point of rotation of a central axis C of hub 200 and the lengthwise axis of upright 300 through central axis C. Watercraft carrier 10 can be configured such that θ is a particular number of degrees. In some embodiments, θ can be between 60° and 180° when watercraft carrier 10 is in the open position 30. In some embodiments, θ can be between 80° and 120° when watercraft carrier 10 is in the open position 30. In some embodiments, θ can be between 90° and 115°. In some embodiments, θ can be about 105°.

Figure 15:
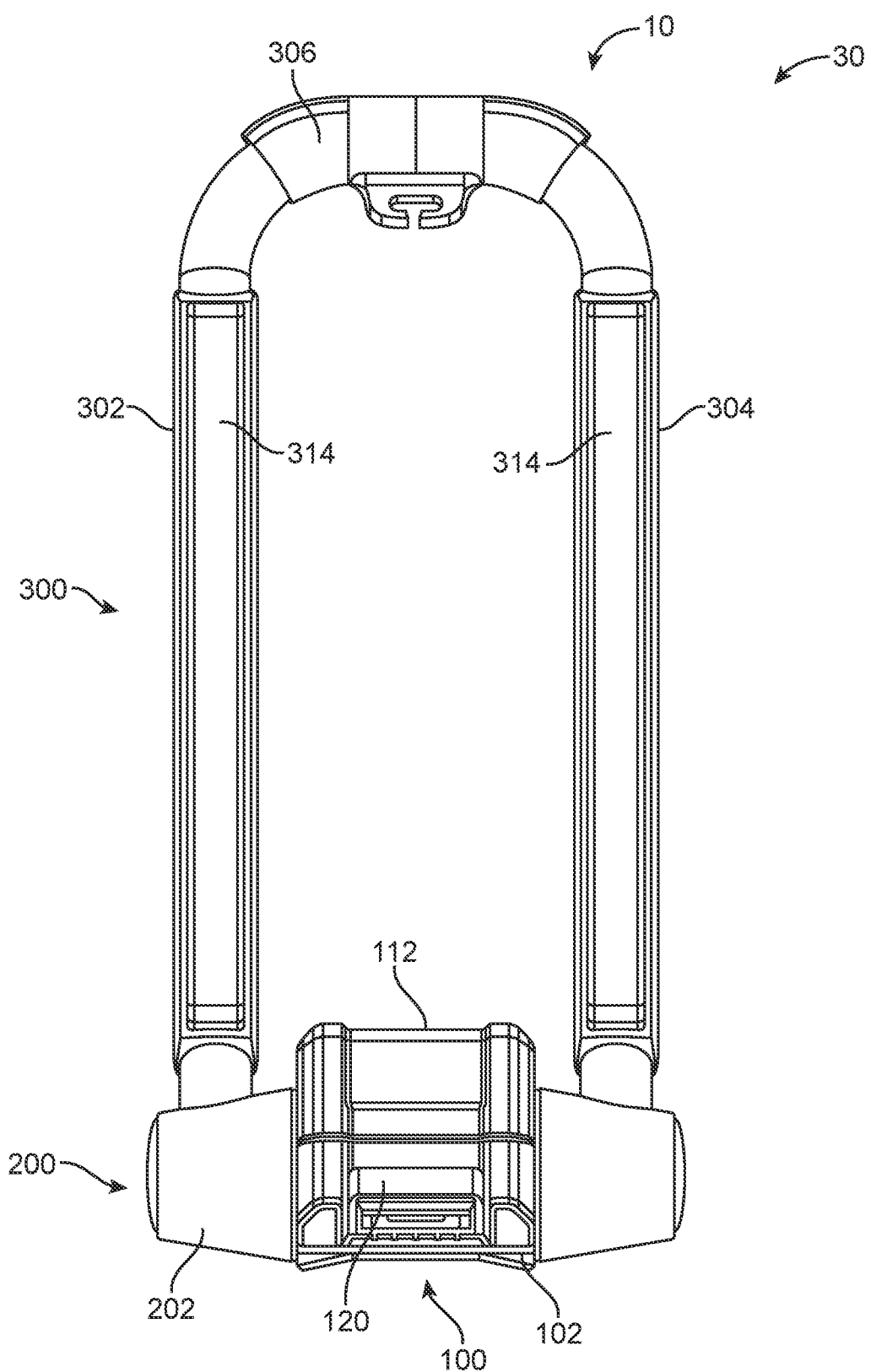
FIG. 15 illustrates a front view of a watercraft carrier, according to an embodiment.
Figure 16:
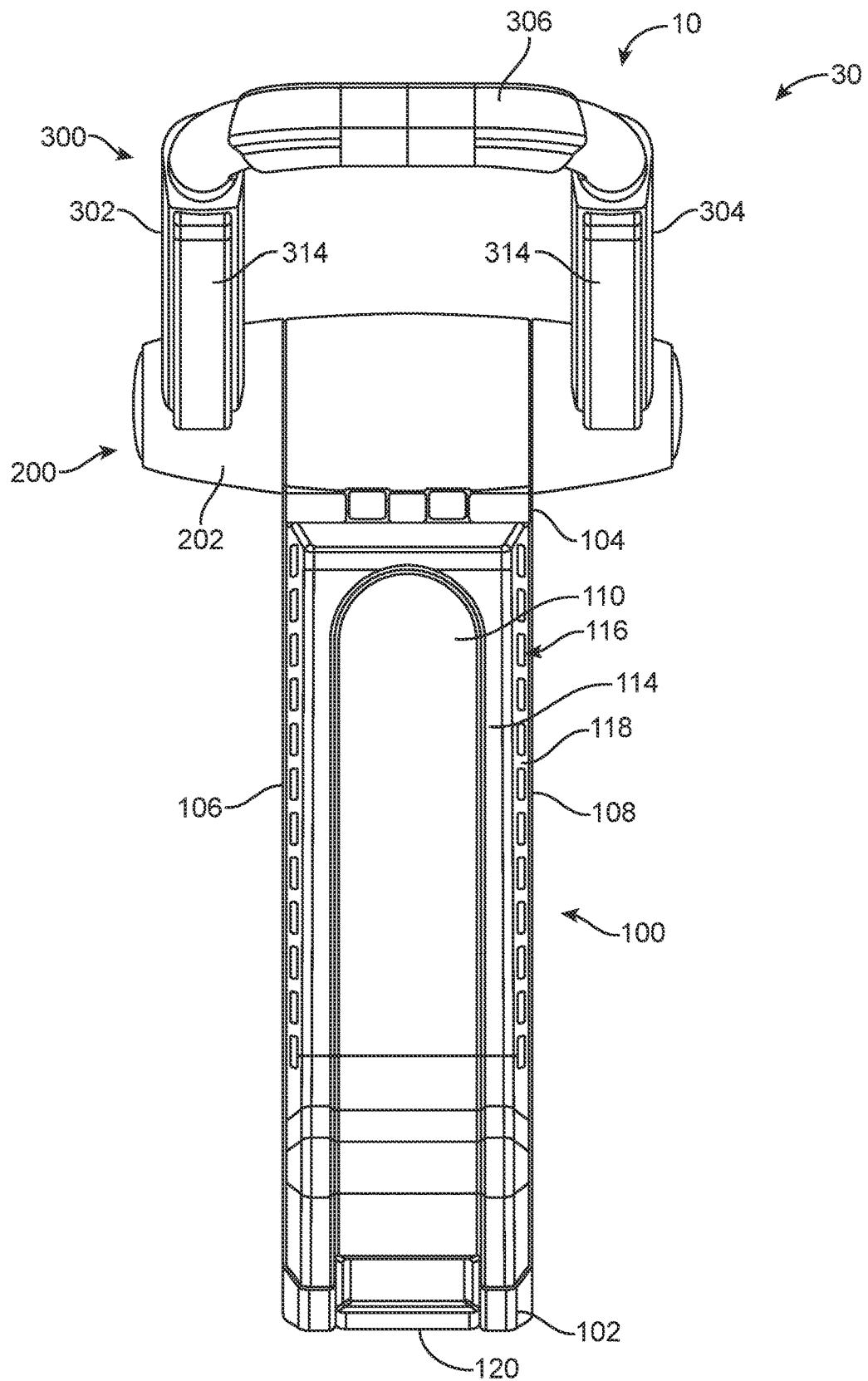
FIG. 16 illustrates a top view of watercraft carrier, according to an embodiment.
Figure 17:
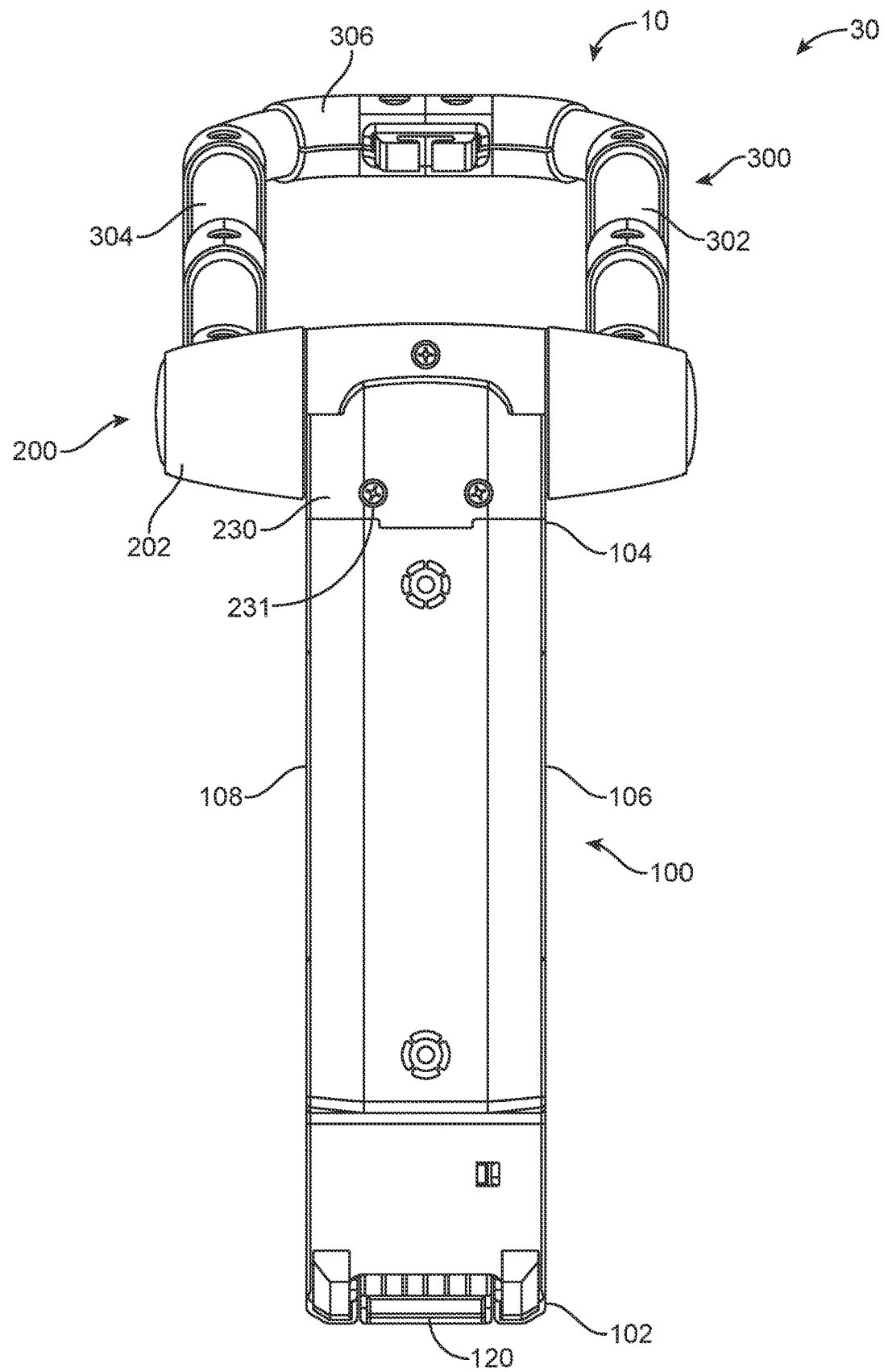
FIG. 17 illustrates a bottom view of a watercraft carrier, according to an embodiment.

FIGS. 15, 16, and 17 illustrate watercraft carrier 10 in an open position 30 from a front view, top view, and bottom view, respectively. Components of watercraft carrier 10 are identified by the same reference numbers as in FIGS. 1-4, 13, and 14.

FIG. 18 illustrates a pair of watercraft carriers 10 coupled to a roof 400 of a motor vehicle via load bars 402. In some embodiments, a mount or footing 404 can couple base 100 of watercraft carrier 10 to a load bar 402 on the roof 400 of the vehicle. In some embodiments, the watercraft 500, for example, but not limited to a kayak, canoe, surfboard, paddleboard, etc. can be disposed along the lengthwise direction of the vehicle, i.e., the traveling direction. In some embodiments, the watercraft 500 can be disposed on base 100 and supported by upright 300 of watercraft carrier 10. In some embodiments, one or more ropes, straps, bungee cords, etc., can be used to secure the watercraft 500 to the watercraft carriers 10 so that the watercraft can be transported on the vehicle.

As shown in FIG. 18, in some embodiments, the handle 120 can be disposed near a side edge of the vehicle. This can make the handle easily accessible to a user standing next to the side of the vehicle. When the watercraft carrier 10 is in the closed position 20, the user can pull the handle 120 and push the upright 300 toward the distal end 104 of the base 100 (i.e., toward the midline M of the vehicle). If pushed forcefully enough, the upright 300 can reach the open position 30 and lock into place in the open position 30. The spring 124 can bias the handle 120 to the rest position. In order to release the upright 300 from the open position 30, the user can again pull the handle 120 in the outboard direction and pull the upright 300 in the outboard direction to the closed position 20. If a strap, for example, is attached to the upright 300, for example to crossbar 306, the user may be able to pull the upright 300 to the closed position 20 without having to reach the upright itself.

Methods of operating a watercraft carrier can be accomplished according to the manners of operation disclosed herein. In some embodiments, a method of operating a watercraft carrier can include activating a handle or other activation device at an outboard end of a base of the watercraft carrier. In some embodiments, activating the handle can release a locking mechanism of an upright. In some embodiments, the locking/unlocking mechanism(s) can be disposed at a distal end of the base, for example, within a hub. In some embodiments, the method can include rotating the upright from a first position to a second position.

In some embodiments, activating the handle can include pulling the handle in an outboard direction. In some embodiments, activating the handle can displace a wedge in a hub at the distal end of the base in a first direction. In some embodiments, displacing the wedge can displace one or more blocks, for example, in a direction perpendicular to the first direction. In some embodiments, displacing the block(s) can displace one or more gears from an engaged configuration such that the upright can rotate from the first position to the second position. In some embodiments, the method can include activating the handle and rotating the upright from the second position to the first position.

It is to be appreciated that the Detailed Description section, and not the Brief Summary and Abstract sections, is intended to be used to interpret the claims. The Summary and Abstract sections may set forth one or more but not all exemplary embodiments of watercraft carriers as contemplated by the inventors, and thus, are not intended to limit the present embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method of operating a watercraft carrier, comprising:
   activating an actuator coupled to a base of the watercraft carrier, wherein:
   activating the actuator releases a locking mechanism of an upright, the locking mechanism disposed at a distal end of the base,
   activating the actuator comprises displacing the actuator in an outboard direction, and
   activating the actuator translates a linkage in the outboard direction, where the linkage is disposed within the base and coupled to the locking mechanism; and
   rotating the upright from a first position to a second position.

2. The method of claim 1, wherein displacing the actuator comprises translating a portion of the actuator in the outboard direction.

3. The method of claim 1, wherein displacing the actuator comprises rotating a portion of the actuator.

4. The method of claim 1, wherein releasing the locking mechanism comprises disengaging a keyed mechanism.

5. The method of claim 1, further comprising rotating the upright from the second position to the first position.

6. The method of claim 5, wherein rotating the upright comprises rotating a crossbar of the upright toward an outboard end of the base.

7. The method of claim 1, further comprising locking the upright in the second position.

8. The method of claim 7, wherein locking the upright comprises releasing the actuator.

9. The method of claim 7, further comprising activating the actuator to release the upright from the second position.

10. The method of claim 1, further comprising attaching a strap to the watercraft carrier and securing a watercraft to the watercraft carrier.

11. The method of claim 10, wherein the strap is attached to the upright.

12. The method of claim 1, wherein the base of the watercraft carrier is fixed parallel to a roof of a vehicle.

13. The method of claim 1, wherein the actuator is disposed at the outboard end of the base.

14. The method of claim 1, wherein the locking mechanism limits rotation of the upright prior to the activating of the actuator.

* * * * *